United States Patent [19]

Ruitenburg

[11] Patent Number: 5,706,060
[45] Date of Patent: Jan. 6, 1998

[54] CIRCUIT ARRANGEMENT FOR APPLYING AN ANTENNA SIGNAL DIRECTLY TO T.V. RECEIVER AND BYPASSING A VCR

[75] Inventor: Leo Ruitenburg, Swalmen, Netherlands

[73] Assignee: U.S. Philips Corporation, New York, N.Y.

[21] Appl. No.: 426,292

[22] Filed: Apr. 20, 1995

[30] Foreign Application Priority Data

Apr. 21, 1994 [DE] Germany ............... 44 13 926.8

[51] Int. Cl.$^6$ ............................................. H04N 5/44
[52] U.S. Cl. ............................................. 348/725; 348/705
[58] Field of Search .................. 348/705, 706, 348/725; 358/335

[56] References Cited

U.S. PATENT DOCUMENTS

| | | | |
|---|---|---|---|
| 4,097,899 | 6/1978 | Yu | 348/706 |
| 4,319,278 | 3/1982 | Shiminu | 348/706 |
| 4,424,591 | 1/1984 | Boardman | 455/289 |
| 4,432,015 | 2/1984 | Lambert et al. | 348/706 |

FOREIGN PATENT DOCUMENTS

| | | |
|---|---|---|
| 3440119 | 5/1986 | Germany . |
| 949557 | 2/1964 | United Kingdom . |

*Primary Examiner*—John K. Peng
*Assistant Examiner*—Nathan J. Flynn
*Attorney, Agent, or Firm*—Leroy Eason

[57] ABSTRACT

A circuit arrangement for optionally applying an antenna signal to a receiver section of a video recorder or to a television receiver connected to the video recorder, by a switching device enabling the antenna signal to be applied only to the receiver section of the video recorder and to be passed from the video recorder to the television receiver in the blocked state of said switching device, and enabling the antenna signal to be applied directly to the television receiver in the conducting state of the switching device. A loop-through of the antenna signal to the television receiver will then also be possible when the video recorder does not convey any current.

2 Claims, 2 Drawing Sheets

CIRCUIT ARRANGEMENT FOR APPLYING AN ANTENNA SIGNAL DIRECTLY TO T.V. RECEIVER AND BYPASSING A VCR

BACKGROUND OF THE INVENTION

1. Field of the Invention

This invention relates to a circuit arrangement for optionally applying an antenna signal to a receiver section of a video recorder or to a television receiver connected to this recorder.

2. Description of the Related Art

U.S. Pat. No. 4,424,591 discloses an arrangement in which one of two signal sources can be coupled to the antenna input of a television receiver. This arrangement comprises an antenna switch which has semiconductor switching elements connecting one of two input terminals to an output terminal when a DC bias voltage is supplied so as to apply a signal to the television receiver. In the state without DC bias, the remaining input is connected to the antenna input of the television receiver. A video recorder or an antenna are optionally connectable to the television receiver by means of this circuit arrangement.

DE-PS 1,151,553 discloses a DC-controlled electronic switch for switching multichannel carrier frequency lines and IF wideband lines in directional radio systems. In these systems, a line to be switched is connected via a coupling capacitor to two diodes and a DC supply choke. Between the first of the two diodes and a capacitor for coupling a second line, a transistor is shunted to ground and a DC supply choke is connected to a negative potential by means of a series resistor. In a corresponding manner, between the second of the two diodes and a second capacitor for coupling a third line, a second transistor is shunted to ground and a second DC supply choke is connected to the negative potential by means of a second series resistor. Two further capacitors short-circuit the residual high frequency occurring at the two DC supply chokes. Moreover, an additional diode may be arranged between the collector terminal of the first transistor and the first capacitor, whose negative terminal is connected to a further negative potential via a third DC supply choke. With this arrangement, one of two lines can be optionally switched to a third line.

Commercially available video recorders comprise a receiver section which is connected to an antenna for the reception of an antenna signal. The antenna signal is looped through via this receiver section to a television receiver connected to the video recorder. However, the antenna signal only reaches the television receiver when the receiver section of the video recorder is switched on. Consequently, at least a pan of the video recorder should always be supplied with energy so as to enable the connected television receiver to operate. This involves additional energy consumption and operating risks.

SUMMARY OF THE INVENTION

It is an object of the invention to provide a circuit arrangement of the type described in the opening paragraph, in which the antenna signal can be supplied to the television receiver, even when the video recorder is switched off.

According to the invention, this object is achieved by a circuit arrangement for optionally applying an antenna signal to a receiver section of a video recorder or to a television receiver connected to this video recorder, by means of a switching device enabling the antenna signal to be applied only to the receiver section of the video recorder and to be passed on from this video recorder to the television receiver in the blocked state of the switching device, and enabling the antenna signal to be applied directly to the television receiver in the conducting state of the switching device.

In the circuit arrangement according to the invention, the antenna signal path between the receiver section and the television receiver is bridged in such a way that, in the conducting state of the switching device, the antenna signal no longer passes through the receiver section of the video recorder. This receiver section can thereby be rendered inoperative without the reception of the antenna signal in the television receiver being influenced.

When the receiver section of the video recorder is switched on, the switching device can be brought to the blocked state, and when the receiver section is switched off, it can be brought to the conducting state. The supply of energy to the receiver section of the video recorder and the operation of the switching device are then preferably coupled so that the switching device is automatically brought to the conducting state when the video recorder and hence the receiver section are rendered inoperative. Consequently, the user need not separately activate the switching device and can thus avoid operating errors. The switching device thus automatically bridges the receiver section when it is switched off. When the receiver section is switched on, the switching device is automatically blocked so as to avoid a signal short-circuit between its input and its output.

In a preferred embodiment of the circuit arrangement according to the invention, the switching device comprises a series arrangement of at least two capacity diodes which are alternately connected in opposite polarity, and in order to bring the switching device to the blocked state, a low potential can be applied to the connections of the anodes of two consecutive capacity diodes in the series arrangement, and a high potential can be applied to the connections of the cathodes of two consecutive capacity diodes in the series arrangement. The number of capacity diodes in this series arrangement may be chosen to be different, dependent on the desired attenuation in the switching device, without necessitating special additional measures. In each state of the switching device, the capacity diodes prevent a DC current flow, so that a mode of operation requiring a very low power will be possible. When the potentials are switched off, the switching device thus formed is brought to its conducting state. Consequently, the energy supply enables it to be switched to the receiver section in a very simple manner.

These and other aspects of the invention will be apparent from and elucidated with reference to the embodiments described hereinafter.

DESCRIPTION OF THE PREFERRED EMBODIMENTS

Figure 1:
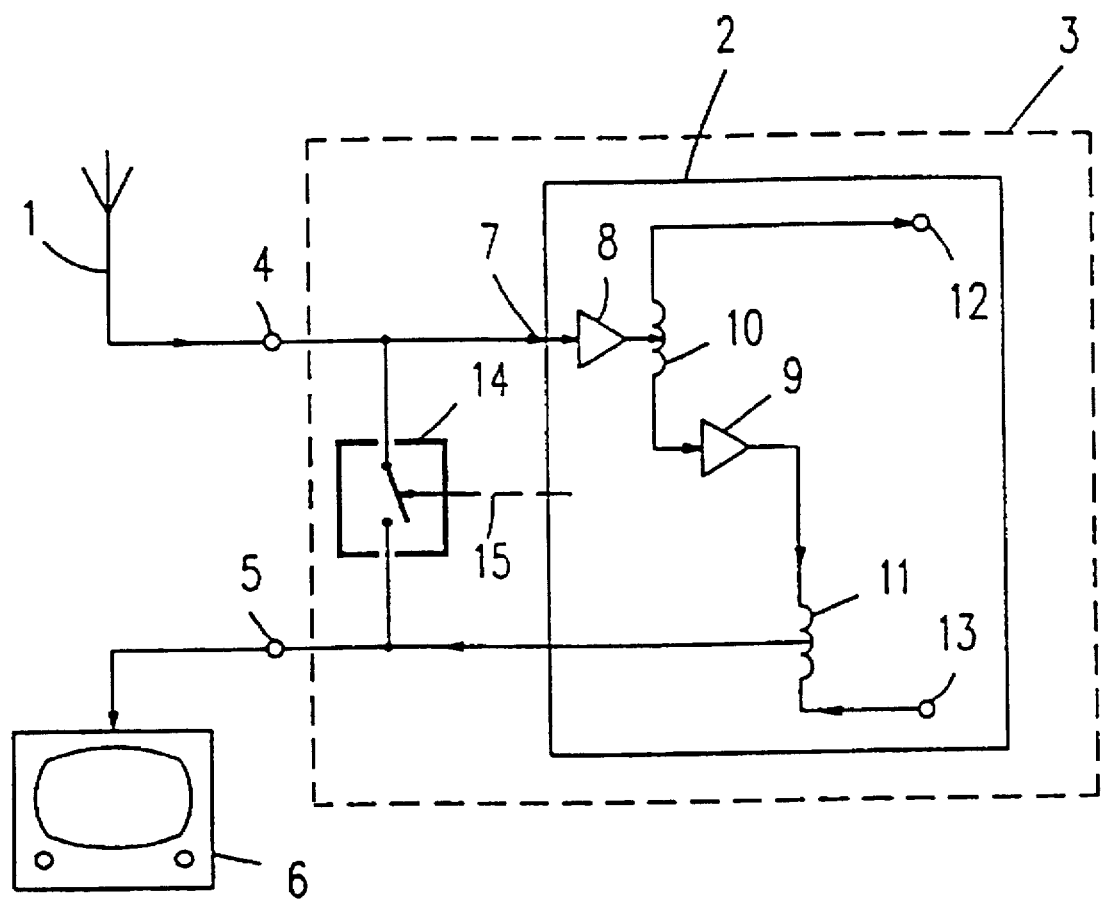
FIG. 1 shows a circuit arrangement according to the invention for optionally applying an antenna signal to a receiver section of a video recorder or to a television receiver.

In the Figures, corresponding elements are denoted by the same reference numerals.

In FIG. 1, the reference numeral 1 denotes an antenna which is connected to a receiver section 2, i.e., an RF receiver section of a video recorder 3, via an antenna input 4. A television receiver 6 is connected to an antenna output 5 of the video recorder 3.

To loop-through the antenna signal from the antenna 1 via the receiver section 2 to the television receiver 6, the antenna input 4 of the video recorder 3 is connected to an input 7 of the receiver section 2 which thus receives the antenna signal. The structure of the receiver section 2 is known per se and therefore is not shown in detail in FIG. 1. Only two wideband amplifiers 8, 9 are shown, which are connected to two inductances 10, 11 and constitute input or loop-through amplifiers for the receiver section 2. The receiver section 2 generally comprises a demodulation arrangement (not shown) which is connected via a terminal 12 to the input 7 and to the wideband amplifier 8 via a part of the inductance 10. A second terminal 13 is connected to a modulation arrangement from which video recorder signals can be supplied via a part of the inductance 11 to the television receiver 6 via the antenna output 5. The wideband amplifier 9 constitutes a signal path with a part of the inductances 10 and 11, in which signal path the antenna signal from the antenna 1 is looped through to the television receiver 6 and is amplified simultaneously when the video recorder 3 is switched on.

According to the invention, the video recorder 3 has a switching device 14 which establishes a direct connection between the antenna 1 and the television receiver 6 and thus bridges the receiver section 2 from the antenna input 4 to the antenna output 5 when it is in a conducting state. The switching device 14 is controlled via a line 15 which is preferably connected to the power supply of the receiver section 2. When this power supply is switched on, the switching device 14 is blocked and when the power supply is switched off, it is rendered conducting. Consequently, the connection between the antenna 1 and the television receiver 6 is continuously maintained, also when the video recorder 3 is switched off.

Figure 2:
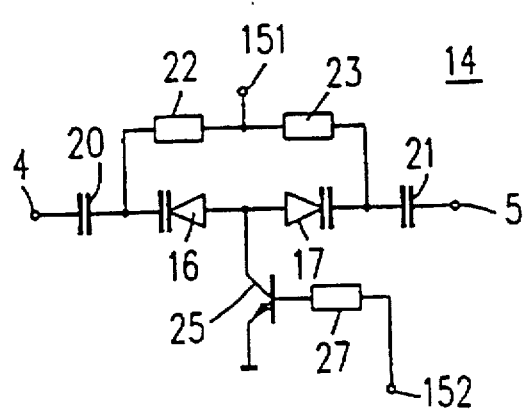
FIGS. 2 to 4 show three embodiments of the switching device used in this circuit arrangement.

FIG. 2 shows a first embodiment of the switching device 14. A series arrangement of two capacity diodes 16, 17 connected in opposite polarity is arranged between the antenna input 4 and the antenna output 5 of the video recorder 3. The cathode of the first capacity diode 16 is connected to the antenna input 4, via a connection that includes a first coupling capacitor 20 for the purpose of DC separation. In a modification of this embodiment, the first coupling capacitor 20 may be replaced by a further capacity diode whose anode is connected to the antenna input 4 and whose cathode is connected to the cathode of the first capacity diode 16. The anode of the first capacity diode 16 is connected to the anode of the second capacity diode 17 whose cathode is connected to the antenna output 5 via a second coupling capacitor 21, which may also be replaced by a capacity diode whose cathode is then to be connected to the cathode of the second capacity diode 17 and whose anode is then to be connected to the antenna output 5.

The cathodes of the capacity diodes 16, 17 are each connected via series resistors 22, 23 to a first control terminal 151. The interconnected anodes of the capacity diodes 16, 17 are connected to ground via a switching transistor 25. A second control terminal 152 is connected to the base terminal of this (first) switching transistor 25 via a first base resistor 27.

The control terminals 151,152 constitute the line 15 in accordance with FIG. 1 and they receive switching voltages which are derived from the power supply voltage for the receiver section 2 of the video recorder 3. For example, a (DC) potential of 33 volts is used as a switching voltage for the first control terminal, when the receiver section 2 is switched on, whereas a potential of 5 volts can be applied as a switching voltage to the second control terminal 152. By corresponding dimensioning of the base resistor 27 and the series resistors 22, 23, as well as of the capacity diodes 16, 17 and the switching transistor 25, other potentials, preferably also corresponding potentials, may,of course,also be used. When switching voltages are applied, the anodes of the capacity diodes 16, 17 are connected to ground, whereas the cathodes convey a high potential. Consequently, the capacity diodes 16, 17 have a very low capacitance so that the signal path from the antenna input 4 to the antenna output 5 has a high signal attenuation. However, if the switching voltages, i.e., the high (DC) potentials, at the control terminals 151 and 152 are switched off, the connection between the anodes of the capacity diodes 16, 17 and ground will be interrupted and the cathodes will convey a low potential. If the control terminals 151,152 do not convey a defined, low potential when the receiver section 2 is switched off, but are rather switched without potential, potential differences tending towards zero will be established between the anodes and cathodes of the capacity diodes 16, 17 (possibly by parasitic leakage resistances), so that the capacity diodes 16, 17 will then have high capacitances. A satisfactory signal coupling between the antenna input 4 and the antenna output 5 is established via these diodes.

Figure 3:
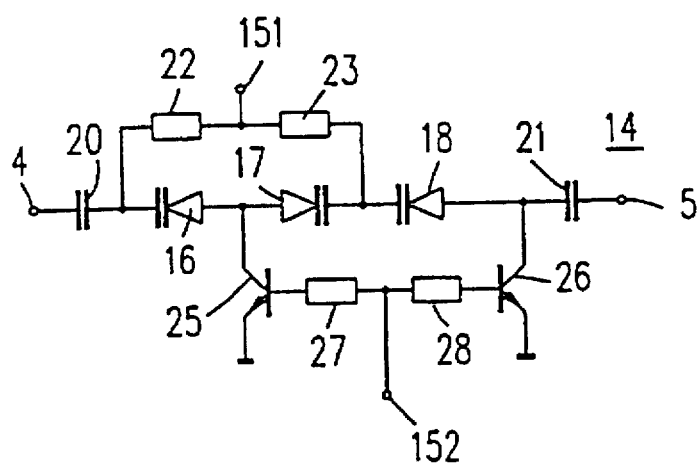
Figure 4:
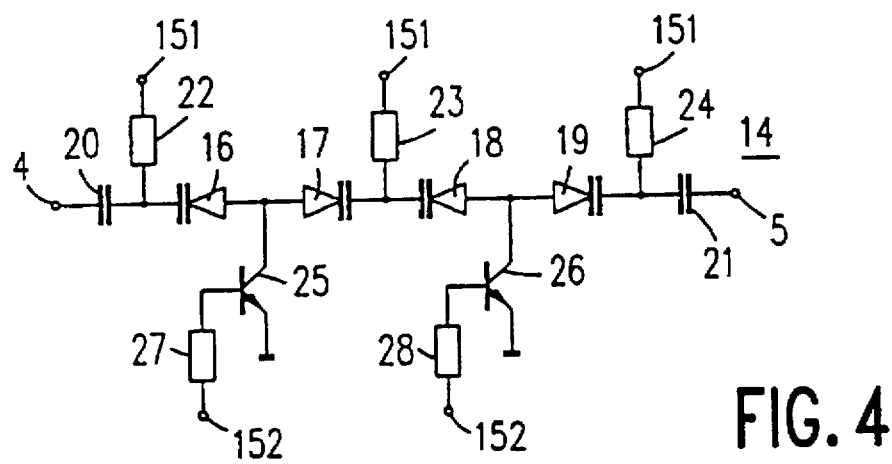

If the signal attenuation which can be achieved with the switching device 14 of FIG. 2 is not adequate when the receiver section 2 is switched on, a third and a fourth capacity diode 18 and 19 may be inserted in the series arrangement between the antenna input 4 and the antenna output 5, as is shown in FIGS. 3 and 4, respectively, which capacity diodes 18, 19 are also series-arranged in alternate opposite polarities and thus continue the alternate polarity of the first and the second capacity diodes 16, 17. The cathodes and anodes of these third and fourth capacity diodes 18, 19 receive the required potentials via the second series resistor 23 or via an additional, third series resistor 24 or a second switching transistor 26 and an associated second base resistor 28, respectively. The series arrangement of the capacity diodes 16 to 19 may be extended arbitrarily.

In a further modification, for example, the third capacity diode 18 may be replaced by a coupling capacitor in the circuit arrangement shown in FIG. 4.

Moreover, the embodiments shown in FIGS. 2 to 4 may be extended with corresponding adaptive elements, for example, inductances, capacitances and resistances for the purpose of frequency response compensation. For example, the capacitive transient response of the switching devices can then at least partly be compensated.

I claim:

1. A circuit arrangement for optionally applying an antenna signal to a receiver section of a video recorder or to a television receiver connected to said video recorder, comprising: a switching device enabling the antenna signal to be applied only to the receiver section of the video recorder and to be passed from said video recorder to the television receiver in the blocked state of said switching device, and enabling the antenna signal to be applied directly to the television receiver in the conducting state of said switching device wherein the switching device comprises a series arrangement of at least two capacity diodes which are alternately connected in opposite polarity, and, in order to bring the switching device to the blocked state, a low potential is applied to the connections of the anodes of two consecutive capacity diodes in the series arrangement, and a high potential is applied to the connections of the cathodes of two consecutive capacity diodes in the series arrangement.

2. A circuit arrangement as claimed in claim 1, wherein the switching device is brought to the blocked state when the receiver section of the video recorder is switched on, and to the conducting state when the receiver section is switched off.

* * * * *